United States Patent
Ma (10) Patent No.: US 11,543,008 B2
(45) Date of Patent: Jan. 3, 2023

(54) TRANSMISSION DEVICE

(71) Applicant: ILLINOIS TOOL WORKS INC., Glenview, IL (US)

(72) Inventor: Yue Ma, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/284,086

(22) PCT Filed: Sep. 10, 2019

(86) PCT No.: PCT/US2019/050321
§ 371 (c)(1),
(2) Date: Apr. 9, 2021

(87) PCT Pub. No.: WO2020/086182
PCT Pub. Date: Apr. 30, 2020

(65) Prior Publication Data
US 2021/0348673 A1 Nov. 11, 2021

(30) Foreign Application Priority Data
Oct. 22, 2018 (CN) .......................... 201811228266.6

(51) Int. Cl.
*F16H 35/10* (2006.01)
*F16D 7/02* (2006.01)
(Continued)

(52) U.S. Cl.
CPC ............. *F16H 35/10* (2013.01); *F16D 7/021* (2013.01); *F16H 1/125* (2013.01); *F16H 57/039* (2013.01);
(Continued)

(58) Field of Classification Search
CPC ........ F16H 35/10; F16H 1/125; F16H 57/039; F16H 2057/0213; F16D 7/021; F16D 7/04
See application file for complete search history.

(56) References Cited

U.S. PATENT DOCUMENTS 6,508,140 B2 * 1/2003 Zaps ....................... F16H 55/14
74/411

FOREIGN PATENT DOCUMENTS

| EP | 0861993 A2 | 9/1998 | |
| FR | 2853372 A1 * | 10/2004 | ............... F16D 3/58 |

(Continued)

OTHER PUBLICATIONS

International Search Report and Written Opinion for PCT/US2019/050321, dated Nov. 11, 2019 (11 pages).

*Primary Examiner* — Thomas C Diaz
(74) *Attorney, Agent, or Firm* — Quarles & Brady LLP (57) ABSTRACT

A transmission device includes an external transmission device, an internal transmission device, and a spacer ring. The external transmission device is cylindrical and has an outer wall and an inner wall. The inner wall has a plurality of inwardly extending arc-shaped protrusions. The internal transmission device is disposed in the inner wall and has an outer circumferential surface including a plurality of outwardly extending arc-shaped protrusions. The spacer ring is located between and contacts the arc-shaped protrusions of the external transmission device and the arc-shaped protrusions of the internal transmission device. When torque between the external transmission device and the internal transmission device is greater than a predetermined torque, one or more of the arc-shaped protrusions of the external transmission device or the arc-shaped protrusions of the internal transmission device deform and the external trans- (Continued)

mission device rotationally slips relative to the internal transmission device.

16 Claims, 9 Drawing Sheets

(51) Int. Cl.
 *F16H 1/12* (2006.01)
 *F16H 57/039* (2012.01)
 *F16H 57/01* (2012.01)
 *F16H 57/021* (2012.01)
(52) U.S. Cl.
 CPC .. *F16H 2035/103* (2013.01); *F16H 2035/106* (2013.01); *F16H 2057/016* (2013.01); *F16H 2057/0213* (2013.01)

(56) References Cited

FOREIGN PATENT DOCUMENTS

| FR | 2853372 A1 | 10/2004 | |
|---|---|---|---|
| JP | 10159866 A | * 6/1998 | ............... F16D 7/04 |
| JP | H10159866 A | 6/1998 | |

\* cited by examiner

TRANSMISSION DEVICE

CROSS REFERENCE TO RELATED APPLICATIONS

The present application represents the United States National Stage of International Application No. PCT/US2019/050321 filed Sep. 10, 2019, which is based on, claims priority to, and incorporates by reference in its entirety Chinese patent application number 201811228266.6, filed on Oct. 22, 2018.

TECHNICAL FIELD

The present application relates to the mechanical field, and in particular to the field of transmission devices.

BACKGROUND ART

In recent years, driving devices have been developed to rotate loads. However, when the load is excessively large, the driving device may stall and be damaged. Therefore, a need exists to prevent the driving device from stalling when the load is excessively large.

SUMMARY OF THE INVENTION

Exemplary embodiments of the present application can address at least some of the above problems. The present application provides a transmission device, comprising an external transmission device, an internal transmission device and a spacer ring. The external transmission device is of a cylindrical shape, the external transmission device has an outer wall and an inner wall, and the inner wall is provided with a plurality of inwardly extending arc-shaped protrusions. The internal transmission device is disposed in the inner wall of the external transmission device, the internal transmission device has an outer circumferential surface, and the outer circumferential surface is provided with a plurality of outwardly extending arc-shaped protrusions. The spacer ring is located between the arc-shaped protrusions of the external transmission device and the arc-shaped protrusions of the internal transmission device, and the spacer ring can be simultaneously in contact with the arc-shaped protrusions of the external transmission device and the arc-shaped protrusions of the internal transmission device. Here, when the rotation driving torque between the external transmission device and the internal transmission device is greater than a predetermined torque, the deformation of the arc-shaped protrusions of the external transmission device or the arc-shaped protrusions of the internal transmission device enables the external transmission device to slip and rotate relative to the internal transmission device.

According to the transmission device described above, when the rotation driving torque between the external transmission device and the internal transmission device is not greater than the predetermined torque, the external transmission device and the internal transmission device can rotate together.

According to the transmission device described above, the outer wall of the external transmission device is provided with transmission teeth such that the external transmission device is an external gear.

According to the transmission device described above, the outer wall of the external transmission device is provided with helical teeth.

According to the transmission device described above, when the external transmission device is driven by an electric motor to rotate, the internal transmission device drives a load to rotate; and when the internal transmission device is driven by the electric motor to rotate, the external transmission device drives the load to rotate.

According to the transmission device described above, the external transmission device and the internal transmission device are made of plastic, and the spacer ring is made of metal.

According to the transmission device described above, the arc-shaped protrusions of the external transmission device and the arc-shaped protrusions of the internal transmission device face one another.

According to the transmission device described above, respective top ends of the arc-shaped protrusion of the internal transmission device are located between two adjacent arc-shaped protrusions of the external transmission device.

According to the transmission device described above, one or more of the arc-shaped protrusions of the external transmission device or the arc-shaped protrusions of the internal transmission device define cavities.

According to the transmission device described above, the number of the arc-shaped protrusions of the internal transmission device is the same as the number of the arc-shaped protrusions of the external transmission device.

The transmission device of the present application can protect the driving device during overload.

BRIEF DESCRIPTION OF THE DRAWINGS

These and other features and advantages of the present application can be better understood by reading the following detailed description with reference to the accompanying drawings. Throughout the accompanying drawings, the same reference numerals represent the same parts. In the figures.

DETAILED DESCRIPTION OF EMBODIMENTS

Particular embodiments of the present application are described below with reference to the accompanying drawings which constitute part of this description. It is to be understood that although the terms indicating directions or orientations, such as "near", "far", "top", "bottom" and "top", are used in the present application to describe various exemplary structural parts and elements in the present application, these terms used herein are, in order to facilitate the illustration, only determined based on the exemplary orientations as shown in the accompanying drawings. Since the embodiments disclosed in the present application can be arranged in different directions, these terms indicating directions are only illustrative and should not be considered as limitations. In the following accompanying drawings, the same reference numerals are used for the same components, and similar reference numerals are used for similar components.

Figure 1:
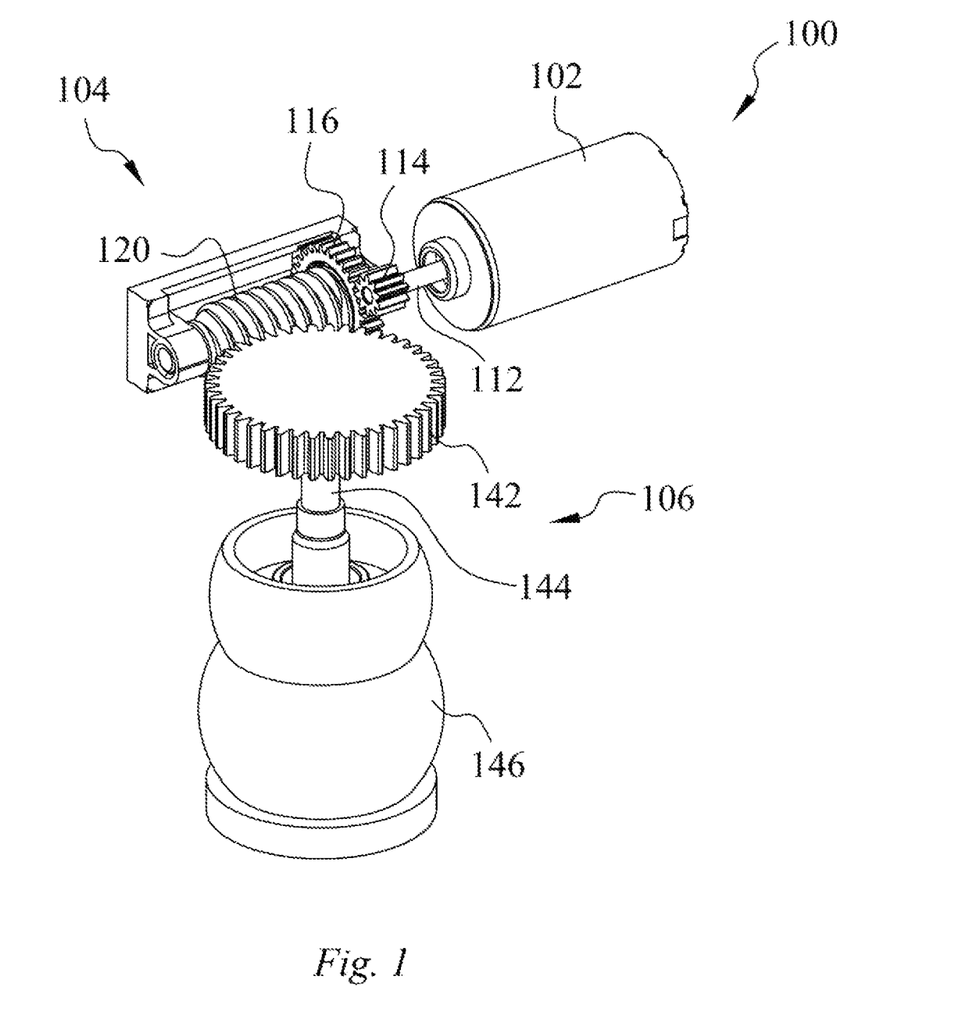
FIG. 1 is an isometric view of a power system using a transmission device of one embodiment of the present application.

FIG. 1 is an assembled schematic diagram of a power system 100 using a transmission device 104 of one embodiment of the present application. As shown in FIG. 1, the power system 100 comprises a driving device 102, a transmission device 104 and a load device 106. The driving device 102 is used to provide a driving torque. The transmission device 104 is used to transfer a driving torque to the load device 106 so as to drive the load device 106 to rotate. In the embodiment shown in FIG. 1, the driving device 102 is a motor, and the load device 106 is a thermostat. In other embodiments, the driving device 102 may be a device other than a motor, and the load device 106 may also be a device other than a thermostat.

As shown in FIG. 1, the motor comprises a rotating shaft 112 and a driving gear 114, and the driving gear 114 is connected to the rotating shaft 112. When the motor is powered on, the driving gear 114 can rotate together with the rotating shaft 112. The driving gear 114 is a spur gear.

The thermostat comprises a gear 142, a rotating shaft 144, a housing 146 and a valve body (not shown). The valve body is accommodated in the housing 146. The valve body is connected to the rotating shaft 144, and the rotating shaft 144 is connected to the gear 142. When the gear 142 is rotated, the valve body and the rotating shaft 144 can rotate together with the gear 142. The gear 142 is a helical gear.

Figure 2A:
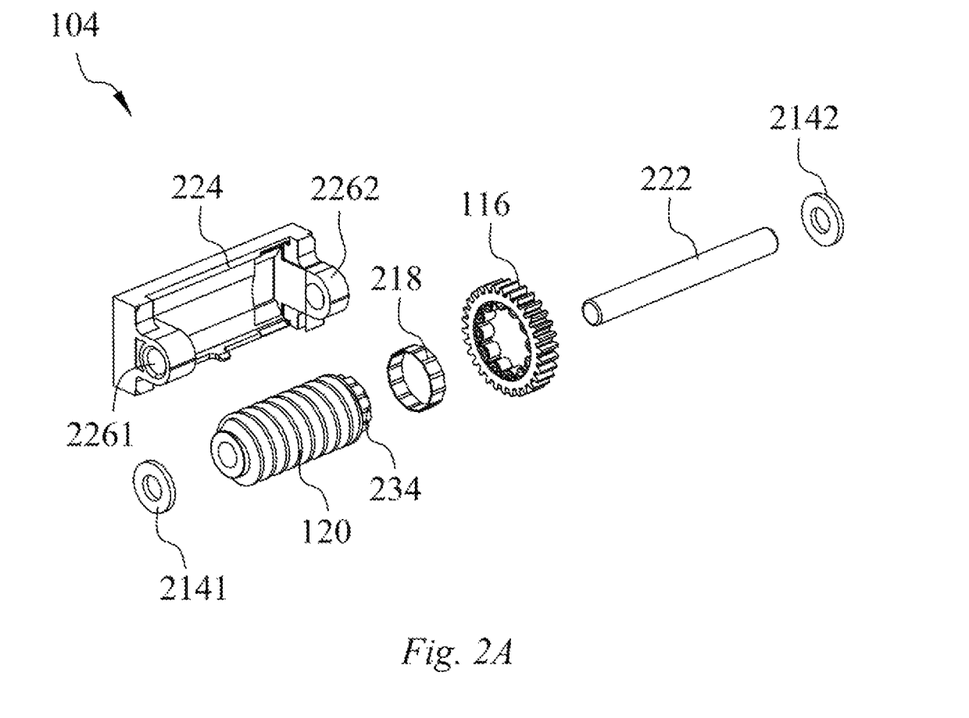
FIG. 2A is an exploded view of the transmission device of FIG. 1.
Figure 2B:
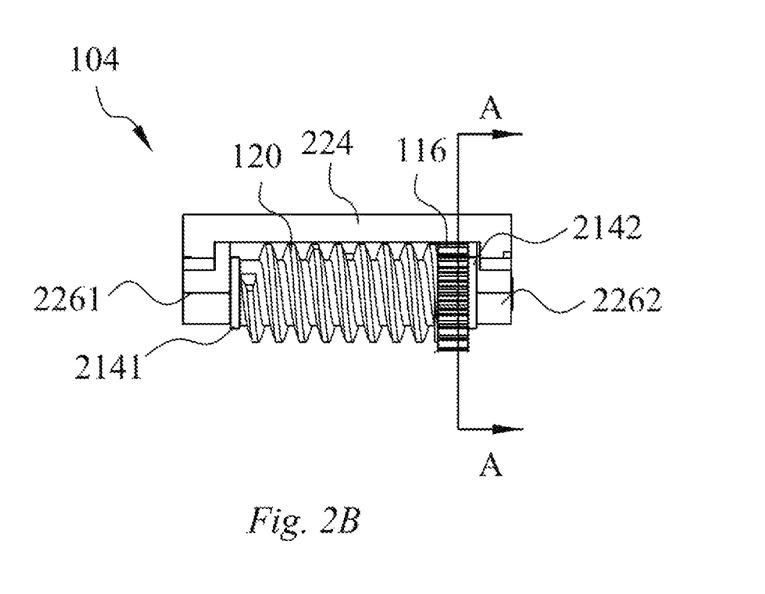
FIG. 2B is a top view of the transmission device of FIG. 1.

FIG. 2A is an exploded schematic diagram of the transmission device 104 shown in FIG. 1 for illustrating the components in the transmission device 104. FIG. 2B is a top view of the transmission device 104 shown in FIG. 1. As shown in FIGS. 2A-2B, the transmission device 104 comprises an external transmission device 116, an annular spacer ring 218, an internal transmission device 120 and a rotating shaft 222. The rotating shaft 222 is inserted into the internal transmission device 120, and two ends of the rotating shaft 222 can extend from two ends of the internal transmission device 120. The spacer ring 218 is sheathed on a proximal end 234 of the internal transmission device 120. The spacer ring 218 and a proximal end 234 of the internal transmission device 120 are accommodated in the external transmission device 116. Thus, the external transmission device 116, the annular spacer ring 218 and the internal transmission device 120 are all sheathed on the rotating shaft 222.

The transmission device 104 further comprises a bracket 224 and a pair of gaskets 2141, 2142. Two opposite ends of the bracket 224 are respectively provided with an annular carrying portion 2261 and an annular carrying portion 2262, and the annular carrying portions 2261, 2262 are used for receiving the rotating shaft 222. Two ends of the rotating shaft 222 are respectively sheathed with the gaskets 2141, 2142 and then are inserted into the carrying portions 2261, 2262 of the bracket 224. Thus, the external transmission device 116, the annular spacer ring 218 and the internal transmission device 120 are carried by the bracket 224 via the rotating shaft 222, and the external transmission device 116, the annular spacer ring 218 and the internal transmission device 120 can rotate around the rotating shaft 222. The outer wall 402 of the external transmission device 116 is provided with straight teeth (see FIGS. 4A-4B) that can be engaged with straight teeth on the driving gear 114 (see FIG. 1) so that when the driving gear 114 rotates, the external transmission device 116 can rotate together with the driving gear 114. A spiral groove 308 (see FIGS. 3A-3B) on the outer circumferential surface 302 of the internal transmission device 120 can be engaged with helical teeth on the gear 142 of the thermostat so that when the internal transmission device 120 rotates, the gear 142 can rotate together with the internal transmission device 120.

Figure 3A:
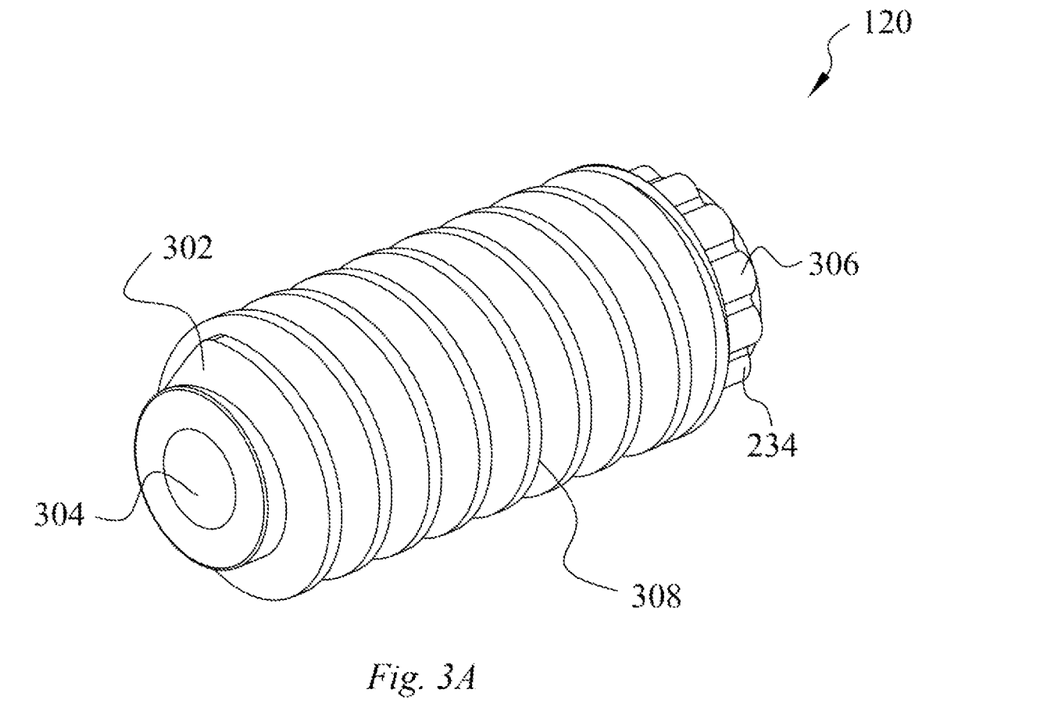
FIG. 3A is an isometric view of an internal transmission device of the transmission device of FIG. 1.
Figure 3B:
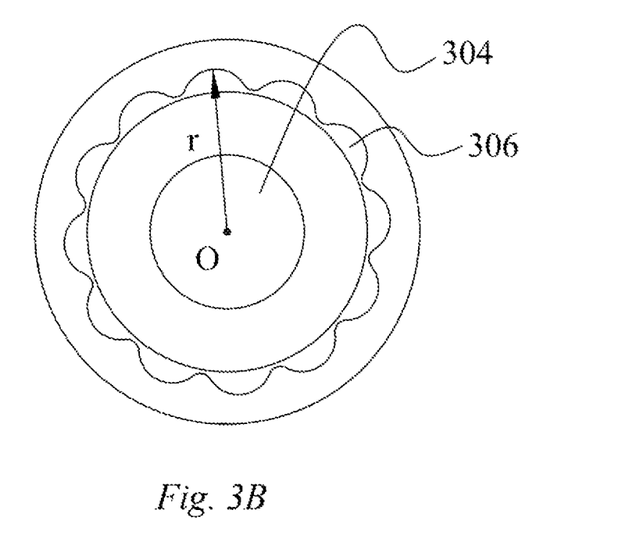
FIG. 3B is a rear view of the internal transmission device of FIG. 3A.

FIG. 3A is a perspective structural schematic diagram of the internal transmission device 120 shown in FIG. 1. FIG. 3B is a rear view of the internal transmission device 120 of FIG. 3A to illustrate the specific structure of the proximal end 234. As shown in FIGS. 3A-3B, the internal transmission device 120 is of a cylindrical shape and has an internal accommodation cavity 304 and an outer circumferential surface 302. In conjunction with FIG. 2A, the internal accommodation cavity 304 is used for accommodating the rotating shaft 222. The outer circumferential surface 302 of the proximal end 234 of the internal transmission device 120 is provided with twelve arc-shaped protrusions 306 extending outward in the radial direction. As an example, the arc-shaped protrusions 306 are arc-shaped, and the twelve arc-shaped protrusions 306 are evenly arranged on the outer circumferential surface 302. The distance from the vertex of the arc-shaped protrusion 306 to the center of rotation O of the internal transmission device 120 is r. The outer circumferential surface 302 of the remaining portion of the internal transmission device 120 is further provided with a spiral groove 308 for engagement with the gear 142 of the thermostat. The internal transmission device 120 can be made of metal (e.g., iron, copper or stainless steel) or plastic.

Figure 4A:
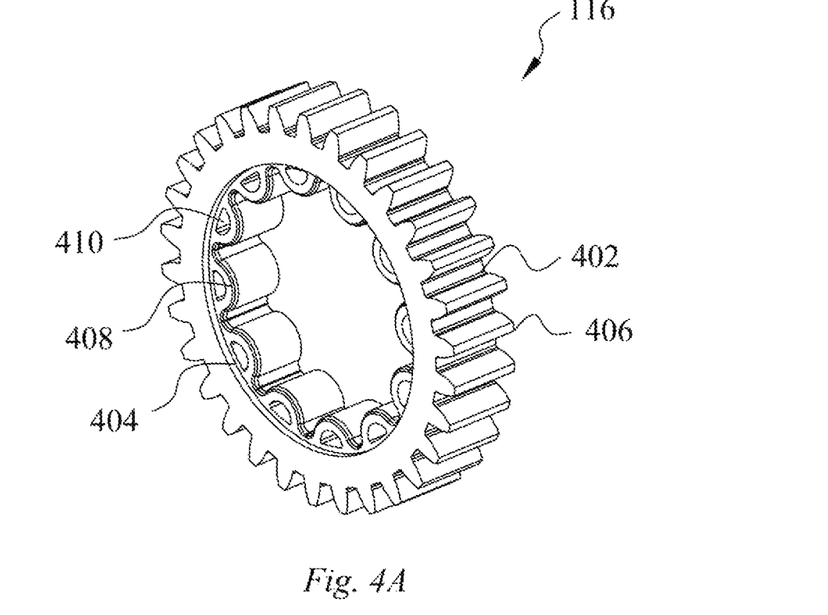
FIG. 4A is an isometric view of an external transmission device of the transmission device of FIG. 1.
Figure 4B:
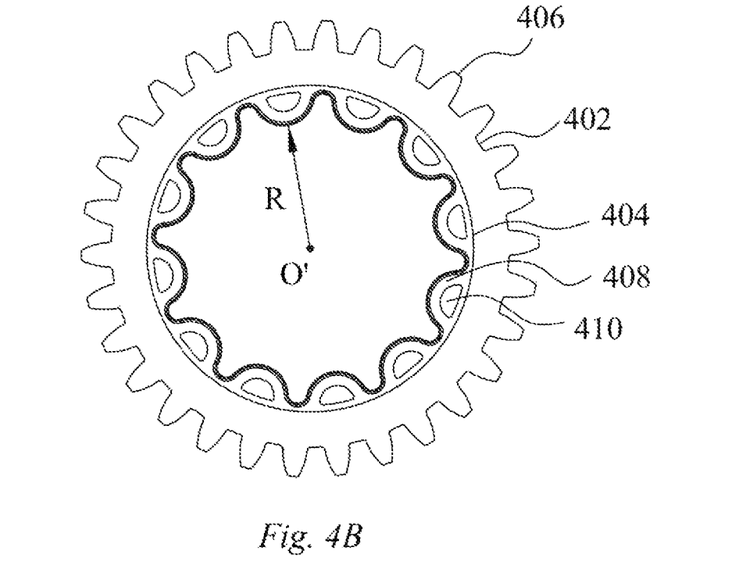
FIG. 4B is a front view of the external transmission device of FIG. 4A.

FIG. 4A is a perspective structural schematic diagram of the external transmission device 116 shown in FIG. 1. FIG. 4B is a front view of the external transmission device 116 shown in FIG. 4A to illustrate the specific structure of the external transmission device 116. As shown in FIGS. 4A-4B, the external transmission device 116 is of a cylindrical shape and has an outer wall 402 and an inner wall 404, and the outer wall 402 is provided with transmission teeth 406 for engagement with the driving gear 114 of the motor (see FIG. 1). The inner wall 404 is provided with twelve arc-shaped protrusions 408 extending inward in a radial direction. As an example, the arc-shaped protrusions 408 are arc-shaped and hollowed out. A cavity 410 is formed at the hollowed-out position so that large deformation can be generated when the arc-shaped protrusions 408 are acted upon by an external force. In a state where the arc-shaped protrusions 408 are not deformed, the distance from the vertex of the arc-shaped protrusions 408 to the center of rotation O' of the external transmission device 116 is R. The external transmission device 116 can be made of metal (e.g., iron, copper or stainless steel) or plastic.

Figure 5A:
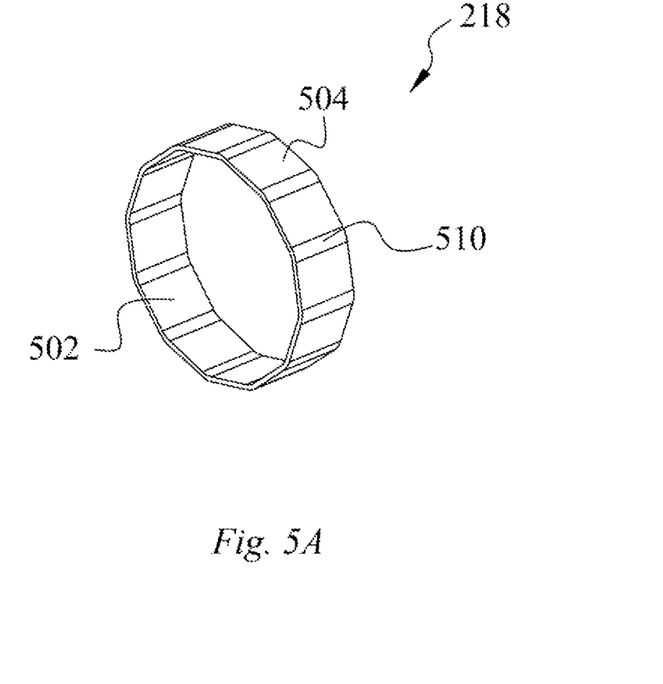
FIG. 5A is an isometric view of a spacer ring of the transmission device of FIG. 1.
Figure 5B:
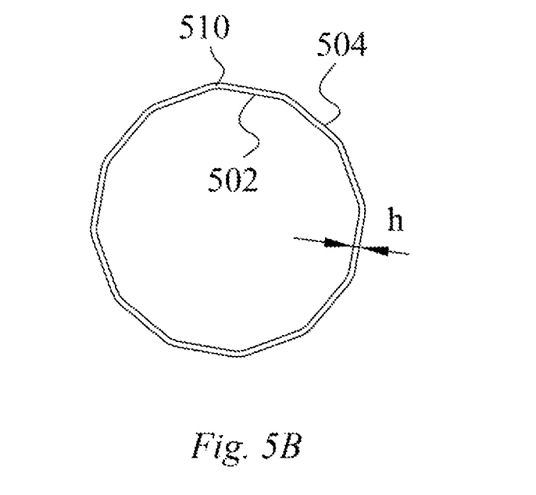
FIG. 5B is a front view of the spacer ring of FIG. 5A.

FIG. 5A is a perspective structural schematic diagram of the spacer ring 218 shown in FIG. 2A. FIG. 5B is a front view of the spacer ring 218 shown in FIG. 5A to illustrate the specific structure of the spacer ring 218. As shown in FIGS. 5A-5B, the spacer ring 218 is of an annular shape and has twelve bent portions 510 uniformly arranged in the circumferential direction thereof so that the radial cross section thereof is a regular dodecagon. The spacer ring 218 has a thickness h. The spacer ring 218 is made of metal (for example, iron, copper or stainless steel).

Figure 6:
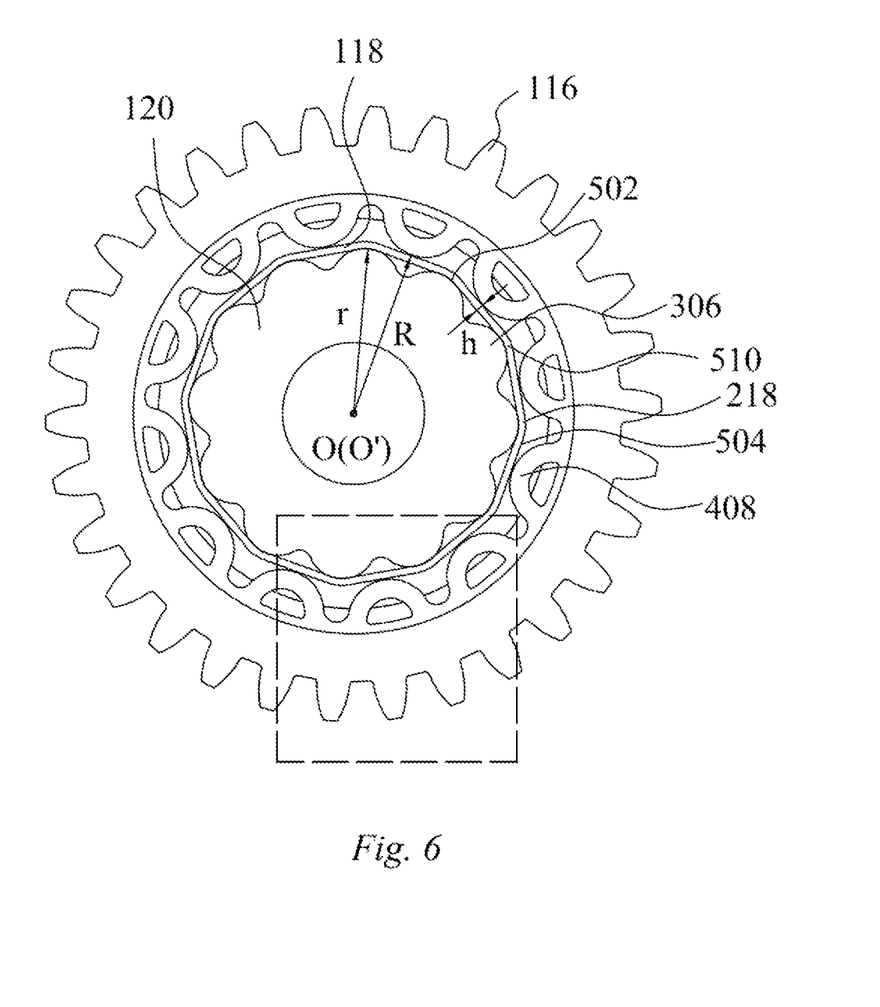
FIG. 6 is a cross-sectional view of the transmission device of FIG. 1 taken along line A-A of FIG. 2B.

FIG. 6 is a cross-sectional view taken along line A-A of FIG. 2B to illustrate the positional relationship among the external transmission device 116, the spacer ring 218 and the internal transmission device 120. As shown in FIG. 6, the center of rotation O' of the external transmission device 116 coincides with the center of rotation O of the internal transmission device 120. The spacer ring 218 is located between the arc-shaped protrusions 408 of the external transmission device 116 and the arc-shaped protrusions 306 of the internal transmission device 120.

The spacer ring 218, the arc-shaped protrusions 408 of the external transmission device 116, and the arc-shaped protrusions 306 of the internal transmission device 120 are dimensioned such that: the outer wall 504 of the spacer ring 218 is in contact with the arc-shaped protrusions 408 of the external transmission device 116, and the inner wall 502 of the spacer ring 218 is in contact with the arc-shaped protrusions 306 of the internal transmission device 120 at the bent portions 510. Specifically, in a state where the arc-shaped protrusions 408 of the external transmission device 116 are not deformed, the sum of the distance r from the vertex of the arc-shaped protrusions 306 of the internal transmission device 120 to the center of rotation O (O') and the thickness h of the spacer ring 218 is greater than the distance R from the vertex of the arc-shaped protrusions 408 of the external transmission device 116 to the center of rotation O (O') (i.e., r+h>R).

Also, the arc-shaped protrusions 408 of the external transmission device 116 are configured to: when the rotation driving torque M between the external transmission device 116 and the internal transmission device 120 is less than or equal to a predetermined torque $M_P$, the arc-shaped protrusions 408 can only generate a small deformation or no deformation, so that the external transmission device 116 will not rotate relative to the internal transmission device 120, but the external transmission device 116 can drive the internal transmission device 120 to rotate; and when the rotation driving torque M between the external transmission device 116 and the internal transmission device 120 is greater than the predetermined torque $M_P$, the deformation generated by the arc-shaped protrusions 408 is sufficient to cause the external transmission device 116 to rotate relative to the internal transmission device 120, so that the external transmission device 116 cannot drive the internal transmission device 120 to rotate. The case where the rotation driving torque M between the external transmission device 116 and the internal transmission device 120 is less than or equal to the predetermined torque $M_P$ occurs when the power system 100 is in normal operation (for example, the load of the load device 106 is less than or equal to the stall torque of the driving device 102), and at this time, the external transmission device 116 can drive the internal transmission device 120 to rotate. The case where the rotation driving torque M between the external transmission device 116 and the internal transmission device 120 is greater than the predetermined torque $M_P$ occurs during overload (for example, the load of the load device 106 is greater than the stall torque of the driving device 102), and at this time, the external transmission device 116 cannot drive the internal transmission device 120 to rotate, and the power system 100 is not in normal operation. The predetermined torque $M_P$ is the rotation driving torque M between the external transmission device 116 and the internal transmission device 120 when the load of the load device 106 is equal to the stall torque of the driving device 102. As an example, when the stall torque of the driving device 102 is 11 Newton-meters (Nm), the predetermined torque $M_P$ is 11 Nm.

Figure 7A:
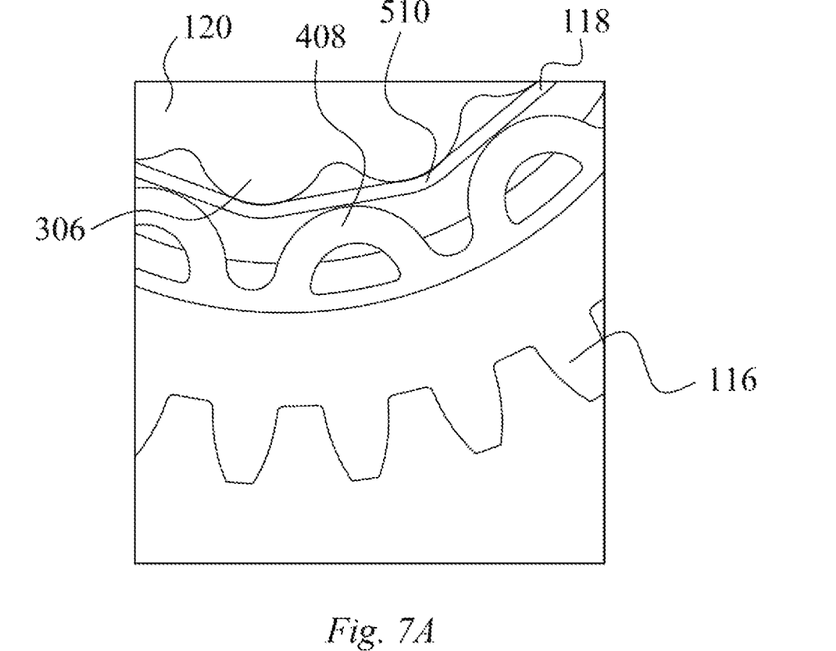
FIGS. 7A-7B are partial enlarged views taken from the dashed box of FIG. 6.
Figure 7B:
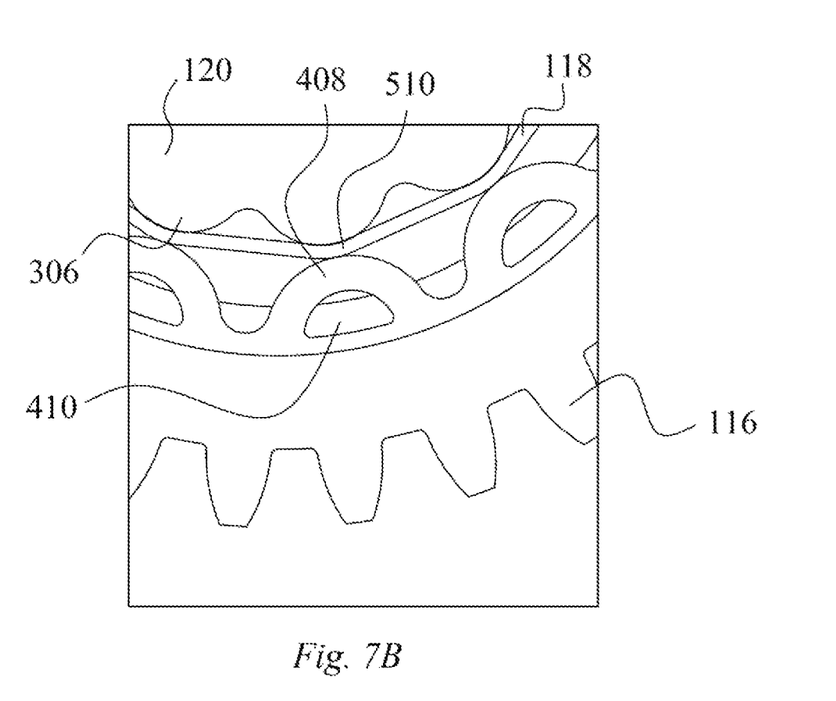

FIGS. 7A-7B are partial enlarged views of the dashed box in FIG. 6. FIG. 7A shows, in more detail, the positional relationship among the external transmission device 116, the spacer ring 218 and the internal transmission device 120 when the power system 100 is in normal operation. FIG. 7B shows, in more detail, the positional relationship among the external transmission device 116, the spacer ring 218 and the internal transmission device 120 when the power system 100 is not in normal operation.

As shown in FIG. 7A, when the power system 100 is in normal operation, the driving torque provided by the driving device 102 can drive the load device 106 to rotate. Specifically, each of the arc-shaped protrusions 306 of the internal transmission device 120 is clamped into the corresponding one of the bent portions 510 on the spacer ring 218 such that the internal transmission device 120 and the spacer ring 218 are stationary relative to each other. The top end of the arc-shaped protrusion 306 of the internal transmission device 120 and its corresponding bent portion 510 are clamped between two adjacent arc-shaped protrusions 408 of the external transmission device 116. Each of the arc-shaped protrusions 408 of the external transmission device 116 is located between two adjacent bent portions 510 of the spacer ring 218. When the external transmission device 116 begins to rotate while the internal transmission device 120 does not rotate, a rotation driving torque (i.e., the torque generated by friction) is generated between the arc-shaped protrusions 408 of the external transmission device 116 and the spacer ring 218 as well as the arc-shaped protrusions 306 of the internal transmission device 120. In the case where the power system 100 is not overloaded, the rotation driving torque M is less than or equal to the predetermined torque $M_P$, and the rotation driving torque can drive the spacer ring 218 and the internal transmission device 120 to rotate so as to cause the external transmission device 116, the spacer ring 218 and the internal transmission device 120 to rotate together.

As shown in FIG. 7B, when the power system 100 is not in normal operation, for example, when the load in the load device 106 is excessively large, the driving torque provided by the driving device 102 is not large enough to drive the load device 106 to rotate. Specifically, when the external transmission device 116 begins to rotate while the internal transmission device 120 does not rotate, a rotation driving torque (i.e., the torque generated by friction) is generated between the arc-shaped protrusions 408 of the external transmission device 116 and the spacer ring 218 as well as the arc-shaped protrusions 306 of the internal transmission device 120. Since the load of the load device 106 to which the internal transmission device 120 is connected is greater than the driving power from the driving device 102 transferred by the external transmission device 116, the rotation driving torque M is greater than the predetermined torque $M_P$, and the rotation driving torque cannot drive the spacer ring 218 and the internal transmission device 120 to rotate. Since the arc-shaped projections 408 are hollowed out to form the cavity 410, the rotation driving torque causes the arc-shaped projections 408 to generate large deformation and causes the arc-shaped projections 408 to no longer remain between two adjacent bent portions 510 of the spacer ring 218, but move in a rotary motion along the outer wall 504 of the spacer ring 218 relative to the spacer ring 218 and the internal transmission device 120. At this time, only the driving gear 114 drives the external transmission device 116 to rotate, while the spacer ring 218 and the internal transmission device 120 do not rotate. In other words, at this time, the external transmission device 116 slips and rotates relative to the spacer ring 218 and the internal transmission device 120.

The transmission device 104 in the present application can provide good power transmission when the power system 100 is in normal operation, and is in a slipping and rotating state when the load of the load device 106 is excessively large so as to prevent the driving device 102 from being directly caught by the load device 106 to cause a stall, thereby protecting the driving device 102. In addition, by providing the spacer ring 218 between the internal transmission device 120 and the external transmission device 116, the present application can reduce the wear generated during rotation of the internal transmission device 120 and the external transmission device 116, thereby improving the operational stability and prolonging the service life of the transmission device 104.

Those skilled in the art would have understood that the number and shape of the arc-shaped protrusions 306 on the internal transmission device 120, the shape of the spacer ring 218, and the number and shape of the arc-shaped protrusions 408 on the external transmission device 116 could be set according to the desired predetermined torque. Those skilled in the art would also have understood that the arc-shaped protrusions 408 of the external transmission device 116 may not be hollowed out, but the arc-shaped protrusions 306 of the internal transmission device 120 are hollowed out, which also enables the external transmission device 116 to be in a slipping and rotating state relative to the internal transmission device 120 when the load of the load device 106 is excessively large.

Figure 8A:
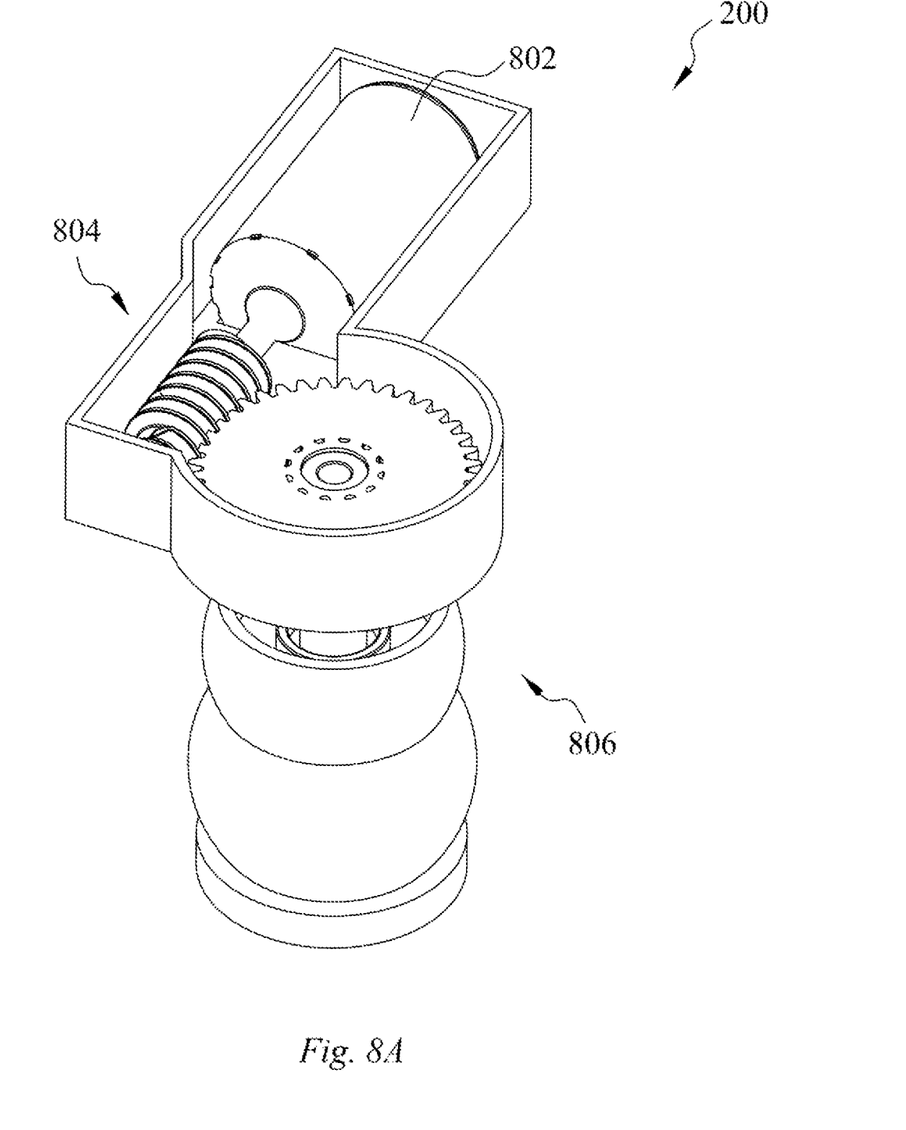
FIG. 8A is an isometric view of a power system using a transmission device of another embodiment of the present application.
Figure 8B:
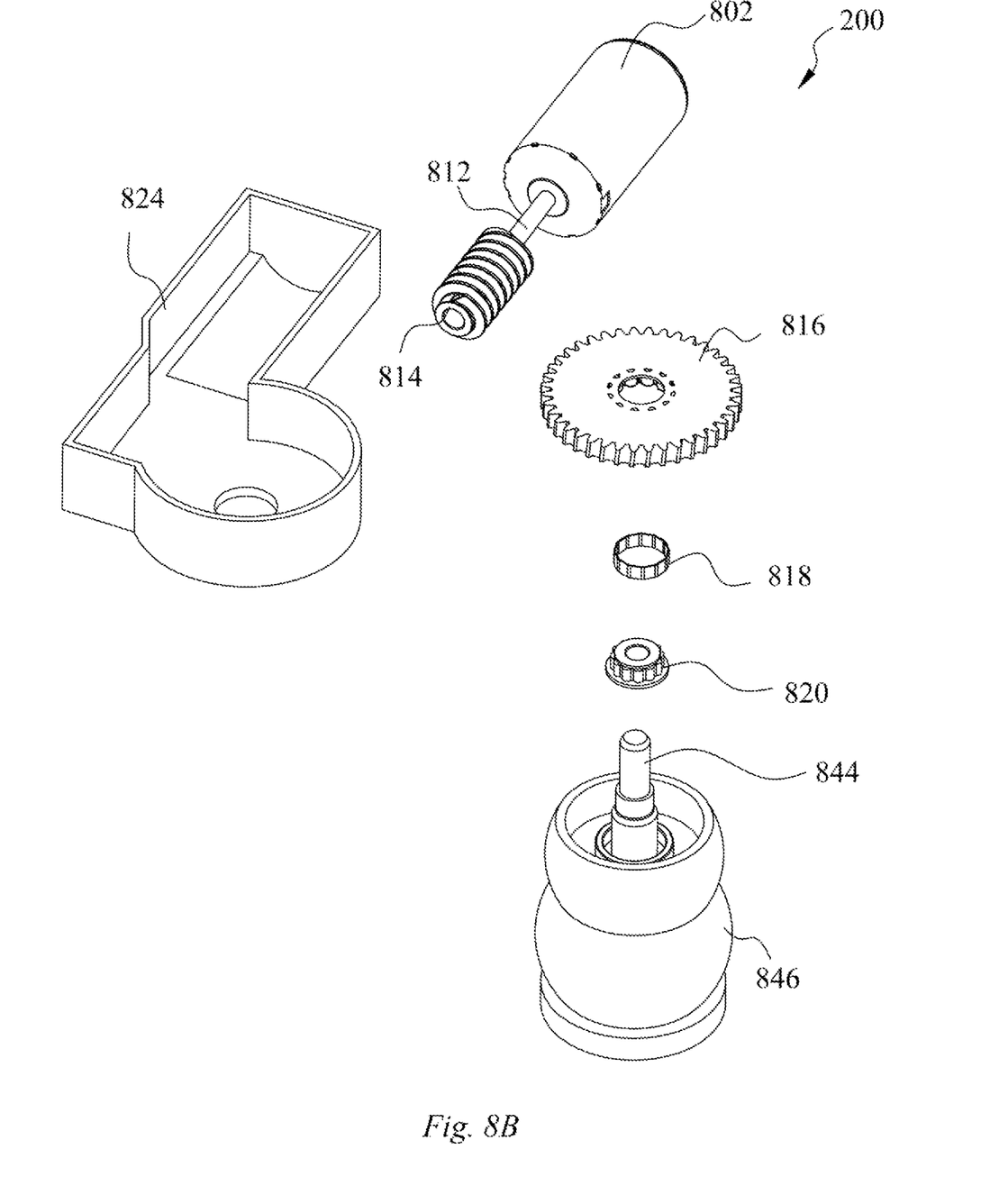
FIG. 8B is an exploded view of the power system of FIG. 7A.

FIG. 8A is an assembled schematic diagram of a power system 200 using a transmission device 804 of another embodiment of the present application. FIG. 8B is an exploded schematic diagram of the power system 200 shown in FIG. 8A for illustrating the components in the power system 200. As shown in FIGS. 8A-8B, the power system 200 comprises a driving device 802, a transmission device 804 and a load device 806. The driving device 802 is used to provide a driving torque. The transmission device 804 is used to transfer a driving torque to the load device 806 so as to drive the load device 806 to rotate. In the embodiment shown in FIGS. 8A-8B, the driving device 802 is a motor and the load device 806 is a thermostat. The motor comprises a rotating shaft 812 and a driving gear 814, and the driving gear 814 is connected to the rotating shaft 812. When the motor is powered on, the rotating shaft 812 can rotate together with the driving gear 814. The driving gear 814 is a worm. The transmission device 804 comprises an external transmission device 816, an annular spacer ring 818 and an internal transmission device 820. The thermostat comprises a rotating shaft 844, a housing 846 and a valve body (not shown). The valve body is accommodated in the housing 846. The valve body is connected to the rotating shaft 844, and the rotating shaft 844 is connected to the internal transmission device 820. The internal transmission device 820 can rotate together with the rotating shaft 844 and the valve body. It should be noted that the spacer ring 818 is similar to the spacer ring 218 in FIG. 2A, the external transmission device 816 is roughly the same as the external transmission device 116 in FIG. 2A, and the internal transmission device 820 is also roughly the same as the internal transmission device 120 in FIG. 2A. The same parts are not described here again. The external transmission device 816 differs from the external transmission device 116 of FIG. 2A in that: in FIG. 2A the outer wall 402 of the external transmission device 116 is provided with straight teeth that engage with the driving gear 114, while in FIG. 8A the outer wall of the external transmission device 816 is provided with helical teeth that engage with the driving gear 814. The internal transmission device 820 differs from the internal transmission device 120 in FIG. 2A in that: in FIG. 2A the outer circumferential surface 302 of the internal transmission device 120 is provided with a spiral groove for engagement with the gear 142 of the thermostat so as to drive the rotating shaft 144, while in FIG. 8A the internal transmission device 820 is directly connected to the rotating shaft 844 of the thermostat so as to drive the rotating shaft 844. The transmission device 804 further comprises a bracket 824, and the bracket 824 is used for accommodating the electric motor, the external transmission device 816, the spacer ring 818 and the internal transmission device 820.

The transmission device 804 in FIGS. 8A-8B can also provide good power transmission when the power system 200 is in normal operation, and can be in a slipping and rotating state when the load of the load device 806 is excessively large so as to prevent the driving device 802 from being directly caught by the load device 806 to cause a stall, thereby protecting the driving device 802.

Those skilled in the art would have understood that, for the transmission device, the transmission connection way between the external transmission device and the driving device and the transmission connection way between the internal transmission device and the load device could be provided according to the difference between the driving device and the load device. Moreover, those skilled in the art would also have understood that, in addition to the method shown in the present application in which the external transmission device is connected to (or engaged with) the driving device and the internal transmission device is connected to (or engaged with) the load device, the method in which the external transmission device is connected to (or engaged with) the load device and the internal transmission device is connected to (or engaged with) the driving device also falls within the scope of protection of the present application.

Although only some features of the present application are illustrated and described herein, those skilled in the art would have made various improvements and modifications. Therefore, it should be understood that the appended claims are intended to cover all the foregoing improvements and changes that fall within the substantial spirit and scope of the present application.

The invention claimed is:
1. A transmission device, comprising:
an external transmission device, the external transmission device being of a cylindrical shape, the external transmission device having an outer wall and an inner wall, and the inner wall being provided with a plurality of inwardly extending arc-shaped protrusions;
an internal transmission device, the internal transmission device being disposed in the inner wall of the external transmission device, the internal transmission device having an outer circumferential surface, and the outer circumferential surface being provided with a plurality of outwardly extending arc-shaped protrusions; and
a spacer ring, the spacer ring being located between the arc-shaped protrusions of the external transmission device and the arc-shaped protrusions of the internal transmission device, and the spacer ring being capable of being simultaneously in contact with the arc-shaped protrusions of the external transmission device and the arc-shaped protrusions of the internal transmission device;

wherein when the rotation driving torque between the external transmission device and the internal transmission device is greater than a predetermined torque, one or more of the arc-shaped protrusions of the external transmission device or the arc-shaped protrusions of the internal transmission device deform to enable the external transmission device to slip and rotate relative to the internal transmission device, and wherein a cavity formed in one or more of the arc-shaped protrusions of the external transmission device and the arc-shaped protrusions of the internal transmission device permits the one or more of the arc-shaped protrusions of the external transmission device or the arc-shaped protrusions of the internal transmission device to deform.

2. The transmission device as claimed in claim 1, wherein when rotation driving torque between the external transmission device and the internal transmission device is less than the predetermined torque, the external transmission device and the internal transmission device rotate together.

3. The transmission device as claimed in claim 1, wherein the outer wall of the external transmission device is provided with transmission teeth such that the external transmission device is an external gear.

4. The transmission device as claimed in claim 1, wherein the outer wall of the external transmission device is provided with helical teeth.

5. The transmission device as claimed in claim 1, wherein:
when the external transmission device is driven by an electric motor to rotate, the internal transmission device drives a load to rotate; and
when the internal transmission device is driven by the electric motor to rotate, the external transmission device drives the load to rotate.

6. The transmission device as claimed in claim 1, wherein the external transmission device and the internal transmission device are made of plastic, and the spacer ring is made of metal.

7. The transmission device as claimed in claim 1, wherein the arc-shaped protrusions of the external transmission device and the arc-shaped protrusions of the internal transmission device face one another.

8. The transmission device as claimed in claim 1, wherein respective top ends of the arc-shaped protrusions of the internal transmission device are located between two adjacent arc-shaped protrusions of the external transmission device.

9. The transmission device as claimed in claim 1, wherein the cavity formed in one or more of the arc-shaped protrusions of the external transmission device and the arc-shaped protrusions of the internal transmission device is a semi-circle-shaped cavity.

10. The transmission device as claimed in claim 1, wherein the number of the arc-shaped protrusions of the internal transmission device is the same as the number of the arc-shaped protrusions of the external transmission device.

11. The transmission device as claimed in claim 10, wherein the spacer ring includes a plurality of bent portions, and
wherein the number of bent portions is the same as the number of the arc-shaped protrusions of the internal transmission device.

12. The transmission device as claimed in claim 1, wherein each arc-shaped protrusion of the external transmission device includes an inward-facing vertex and a distance between the inward-facing vertex and a center of the external transmission device defines a first radius (R),
each arc-shaped protrusion of the internal transmission device includes an outward-facing vertex and a distance between the outward-facing vertex and a center of the internal transmission device defines a second radius (r),
the spacer ring defines a ring thickness (h), and
wherein the first radius (R) is less than the sum of the second radius (r) and the ring thickness (h).

13. The transmission device as claimed in claim 1, wherein the number of the arc-shaped protrusions of the external transmission device is twelve.

14. The transmission device as claimed in claim 13, wherein the number of the arc-shaped protrusions of the internal transmission device is twelve.

15. The transmission device as claimed in claim 1, wherein a radial cross section of the spacer ring is a regular polygon.

16. The transmission device as claimed in claim 15, wherein the radial cross section of the spacer ring is a regular dodecahedron.

* * * * *